Jan. 27, 1942.  W. H. ZACHRY  2,271,167
MOP CONSTRUCTION OR THE LIKE
Filed May 27, 1939
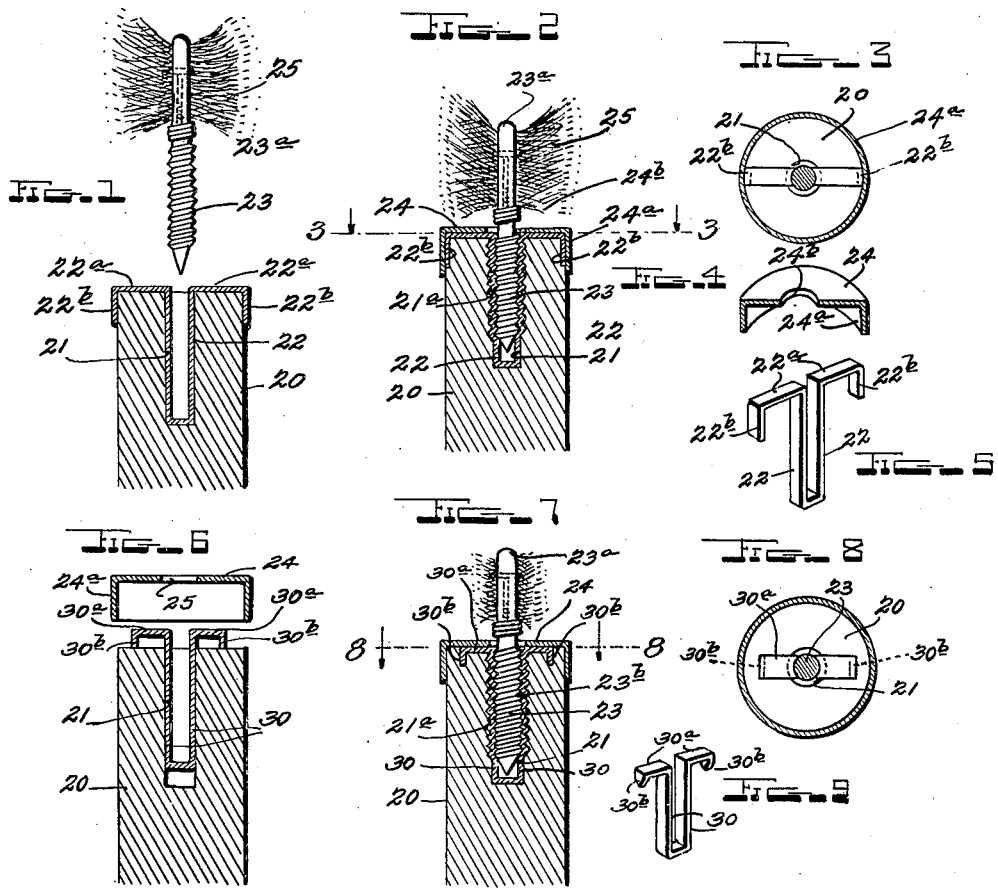
W. H. ZACHRY
INVENTOR.
BY Eugene Stevens
ATTORNEY Patented Jan. 27, 1942

2,271,167

UNITED STATES PATENT OFFICE 2,271,167

MOP CONSTRUCTION OR THE LIKE

Walter H. Zachry, Atlanta, Ga.

Application May 27, 1939, Serial No. 276,237

2 Claims. (Cl. 306—30)

My invention relates to improvements in mops, including oil mops, dusting mops, and the like, it being understood however, that the invention in its broadest aspects will have broader application—i. e. to detachable head tools.

One of the important objects of the invention is to provide a replaceable head structure for a mop or the like which is adapted to be carried by a handle, and wherein one of the head and handle members has a socket adapted to receive a threaded shank of the other member, the said socket having disposed therein a lineally extending soft metal element which is adapted to be compressed by the threads or ribs of a shank member to form corresponding indentations in the wall of said socket whereby to assure of the parts remaining assembled.

Another object of the invention is to provide a handle and head assembly applicable to mops, tools, etc., a socket element and a threaded or ribbed connecting shank, a lineal movement retainer for retaining a soft metal or the like socket insert or liner in position while the ribbed or screw shank is being inserted into the socket.

The invention also resides in certain novel features of construction, combination and arrangement of the various parts, all of which will be readily understood and appreciated by those skilled in the art upon reference to the accompanying drawing in connection with the detailed description to follow.

Although several mechanical expressions of the invention have been illustrated in the drawing and will be dealt with in the description, yet, nevertheless, it is understood that I do not limit myself thereto, but may make various changes and modifications within the spirit and scope of the subject matter claimed hereinafter.

In the drawing, wherein the same reference characters have been used to designate the same parts in all views—

Figure 1 is a fragmentary longitudinal sectional view through the end of a mop handle or the like, and illustrating the head element in fragmentary form ready for application.

Figure 2 is a view similar to Figure 1 but illustrating the use of a ferrule which is pressed onto the end of the handle before the handle and head connection is made—the head being shown assembled with the handle.

Figure 3 is a cross sectional view taken on the line 3—3 of Figure 2.

Figure 4 is a cross sectional perspective view through the ferrule element shown in Figure 2.

Figure 5 is a perspective view of the preferably soft metal partial liner for the socket end of the handle shown in Figures 1 and 2.

Figure 6 is a longitudinal sectional view through the end of a mop handle but illustrating a different form of partial liner for the axial socket of the handle, and also the ferrule or cap removed.

Figure 7 is a view similar to Figure 6 but showing the ferrule in place and the mop head carrying screw turned fully down into position.

Figure 8 is a cross sectional view taken on the line 8—8 of Figure 7.

Figure 9 is a perspective view of the partial handle socket liner illustrated in Figures 6 and 7.

Referring to the drawing by reference characters and having reference to the form of invention shown in Figures 1, 2, 3, 4 and 5, numeral 20 designates the end of a mop handle or the like which has the axial bore opening from its end to receive the shank of the screw 23. The bore 21 is made diametrically smaller than the screw 23 by preference and has disposed therein the intermediate U-shaped portion of a strip of what is preferably soft metal, indicated at 22. The outer ends of the strip 22 are bent laterally as indicated at 22a and are downturned as indicated at 22b along the outer surface of the handle 20 adjacent its end. Thus when the screw 23, which carries the mop head 25, is screwed tightly down into the bore 21a the strip portion 22 will be indented by the threads of the screw and will be pressed into the wall of the bore 21, as indicated in Figure 2. Obviously, the threads of the screw 23 will also cut threads in those portions of the bore wall which are intermediate the legs of the U-shaped member 22 as the screw is thicker than the diameter of the bore. In this way the threads of the screw 23 cannot strip the threads formed directly in the wall of the socket and the screw can be removed to receive a new mop head and then replaced. The combination of metal and wooden threads thereby formed in the walls of the bore combine the resilient grip of the wooden threads with the anti-wear feature of the metal threads. The cap or ferrule 24 will preferably be clamped onto the end of the handle 20 so as to clamp the portions 22a, 22b of the strip member 22 and prevent them from being pulled or jammed down into the bore 21 when the screw 23 is turned home. It will be understood that as to the form of invention shown in Figures 1-5 inclusive, the mop head or the like 25 will be suitably wired to the eye 23a at the outer end of the screw 23.

Figures 6, 7, 8 and 9 illustrate a slightly modified form of the invention in that the partial liner for the bore 21 of the handle 20 provides the intermediate leg portions 30 corresponding to the portion 22 of Figures 1 and 2 but has its laterally turned portions 30a terminating short of the outer edge of the handle 20 and provided with downturned sharpened portions 30b. Thus when the ferrule or cap 24 is driven home the barbed terminals 30b of the portions 30a of the member 30 will be driven into the end of the mop handle; and when the screw 23 is turned home the leg portions 30 of the bore liner will not be jammed.

The manner in which the mop head 25 is secured to the eye 23a of the screw 23 in Figures 2 and 7 will be similar to that shown in Figure 10, a wire 31 being looped through eye 23a, and then about the fibrous head 25, with its ends secured about screw shank 23.

From the foregoing description it is believed that my invention will be readily understood and appreciated by those skilled in the art. By providing a partial soft metal, or the like, liner for the axial bore of the handle and using a slightly oversized screw such as 23, the latter presses threads into the liner which in turn make thread-like indentations in the wall of the bore or hole 21. Thus screwing the screw such as 23 in and out will not wear out the intermediate threads in the soft wood or the like of the bore and the handle can be used many times for different heads.

Having thus described my invention what I claim as new is:

1. In an implement head and handle construction, handle and head members, one of said members having a bore in one end, a screw threaded shank extending from the other member, a U-shaped liner disposed in said bore with portions at opposite sides thereof and formed of deformable material which is harder than the bore wall, the diameter of said bore being less than the maximum diameter of the shank, the ends of said U-shaped member being bent laterally to overlie the end and outer periphery of the bore providing member, anchoring means for said laterally bent ends of said liner, and said shank upon being forced into the said bore making sustaining indentations in said liner portions and the intermediate portions of the wall of the bore and causing said liner indentations to indent the underlying portions of the wall of said bore.

2. In an implement handle and head construction, handle and head members, one of said members having a bore in one end, a screw threaded shank extending from the other member, a U-shaped liner disposed in said bore with portions at opposite sides thereof, said liner being formed of readily deformable material which is harder than the bore wall, the diameter of said bore being less than the maximum diameter of said shank, and said shank being adapted to be screwed into said lined bore to form sustaining indentations in said liner portions and the intermediate portions of the wall of the bore and to cause said liner indentations to indent the underlying portions of the wall of said bore.

WALTER H. ZACHRY.